United States Patent

Brittain

[11] Patent Number: 4,743,193
[45] Date of Patent: May 10, 1988

[54] TILE MAKING MACHINES

[75] Inventor: David R. Brittain, Crowborough, United Kingdom

[73] Assignee: Marley Tile A.G., Switzerland

[21] Appl. No.: 932,309

[22] Filed: Nov. 19, 1986

[30] Foreign Application Priority Data

Nov. 19, 1985 [GB] United Kingdom ............... 8528396

[51] Int. Cl.⁴ ............................................. B65G 49/00
[52] U.S. Cl. ....................................... 425/253; 198/732; 425/452; 425/DIG. 117; 425/DIG. 118
[58] Field of Search ..... 425/253, 452, 200, DIG. 117, 425/DIG. 118, 254, 255; 198/732, 425, 461

[56] References Cited

U.S. PATENT DOCUMENTS

| | | | |
|---|---|---|---|
| 1,740,582 | 12/1929 | Farmer | 198/732 X |
| 2,090,928 | 8/1937 | Aisher | 198/732 |
| 3,257,701 | 6/1966 | Lang | 425/253 X |
| 3,550,754 | 12/1970 | Ganz | 198/425 |
| 3,677,686 | 7/1972 | Powel | 425/253 X |
| 3,751,205 | 8/1973 | Patten, Jr. | 425/253 |
| 3,929,220 | 12/1975 | Powel | 198/732 |
| 4,386,694 | 6/1983 | Van Heel et al. | 425/253 X |
| 4,417,653 | 11/1983 | Zwezerynen | 198/732 X |

FOREIGN PATENT DOCUMENTS

| | | | |
|---|---|---|---|
| 1060219 | 3/1967 | United Kingdom . | |
| 1242441 | 8/1971 | United Kingdom | 425/253 |
| 1382180 | 1/1975 | United Kingdom . | |
| 2139590 | 11/1984 | United Kingdom | 198/732 |

Primary Examiner—Richard L. Chiesa
Attorney, Agent, or Firm—Bacon & Thomas

[57] ABSTRACT

Apparatus for propelling a succession of pallets in a longitudinal direction has a plurality of pawls for pushing the pallets and spaced apart on a pair of endless drive chains each having a portion extending parallel to a pallet guide means. Each pawl is arranged to move in such a way that in use it engages one of the pallets to push it along the guide means and disengages from the pallet further down the guide means, the movement of each pawl being controlled by an associated cam follower wheel cooperating with one of a pair of longitudinally extending cam tracks. The cam follower wheel can be laterally moved on a shaft to select the appropriate cam track for the type of pallets to be conveyed, so that the apparatus can be easily adapted to e.g. different length pallets.

17 Claims, 2 Drawing Sheets

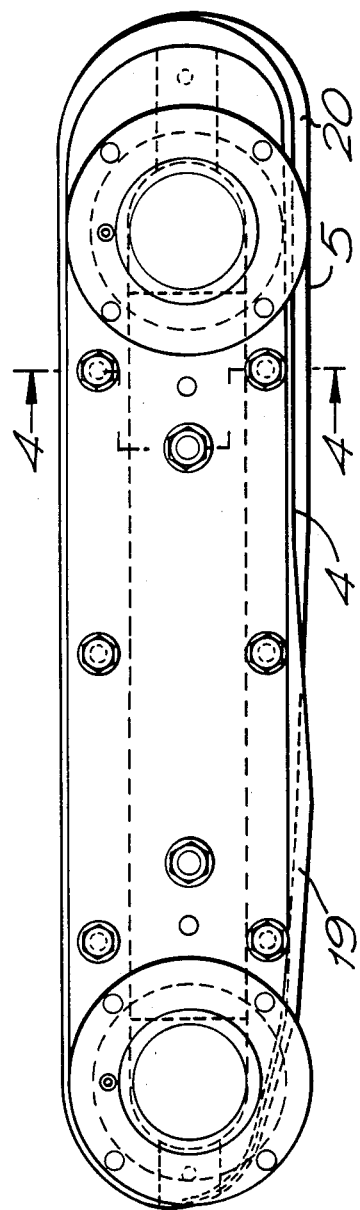
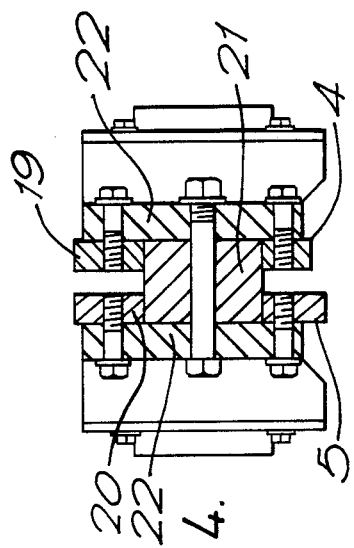
FIG.3.
FIG.4.

TILE MAKING MACHINES

FIELD OF THE INVENTION

This invention relates to apparatus for propelling pallets in which tiles are to be formed and to tile making machines including such apparatus.

DESCRIpTION OF RELATED ART

It is known to propel an end-to-end succession of pallets through a tile extrusion device by means of a number of pawls which are each supported by a pair of drive chains. Each pawl locates against an appropriate part of a pallet and then accelerates to take over the pushing function from the pawl in front, the pressure on the pawl in front then being relieved so that it can be removed from its pushing position. The path of the pawls and their variation in speed is obtained by mounting each pawl on a carrying arm which can rotate about a shaft carried by the drive chains, and this rotation is controlled by a wheel arranged to run along a profiled track and act on the carrying arm. The profile of the track is designed to give the precise path of the pawls required to ensure a smooth take-over of effort from each pawl to its successor. The necessary profile depends on the spacing between the parts to be pushed of successive pallets and is therefore dependent on the shape, and in particular the length, of the pallets.

With such conveying apparatus, when it is desired to change the pallets and produce tiles of a different length, the profiled track must be changed over and the apparatus adjusted to produce the new required path of the pawls, or alternatively, the entire conveying apparatus must be replaced. Either of these changes over operations is time-consuming and expensive.

SUMMARY OF THE INVENTION

The invention provides apparatus for propelling a succession of pallets in a longitudinal direction, comprising means for pushing the pallets forward on a pallet guide means, the pushing means including a plurality of pawls spaced apart on an endless drive member having a portion extending substantially parallel to said guide means, each said pawl being arranged to move in such a way that in use it engages one of said pallets to push it along the guide means and disengages from the pallet further down the guide means, the movement of each pawl being controlled by at least one associated cam follower cooperating with a longitudinally extending cam surface, there being a plurality of such cam surfaces and means for effecting relative movement between the or each cam follower and said surfaces to select the appropriate surface for the type of pallets to be conveyed.

With such an arrangement, the propelling apparatus can be simply and quickly adjusted to accommodate pallets e.g. of different length by selecting the cam surface provided for a given length of pallet, thereby ensuring the precise movement of the pawls needed for those particular pallets.

In one preferred embodiment, two cam surfaces are provided comprising a pair of parallel spaced apart plates, the edges of the plates forming profiled cam tracks. However, it is also possible to provide three, four or even more cam surfaces, so that tiles of many different lengths could be produced with ease.

In an embodiment where just one cam follower is provided, the cam surfaces may themselves be laterally movable across the propelling apparatus in order to select the desired cam surface. Preferably however selection is effected by laterally moving the cam follower. In a preferred embodiment each pawl and its associated cam follower are together supported by a shaft driven by a pair of endless drive chains. In such an arrangement selection of the cam surface may be achieved by moving the pawl and cam follower across the apparatus on the shaft. One or more fixing collars may for example be used laterally to position these components on the shaft. Alternatively, just the cam follower may be laterally movable from one cam surface to another, with the pawl remaining in a fixed lateral position.

In one possible arrangement, a plurality of cam followers may be associated with each pawl, each such cam follower corresponding to one of the cam surfaces and being selectively engageable therewith. In this arrangement, one cam follower can be engaged with its corresponding cam surface to provide the required movement of the pawls, while the or each other cam follower is disengaged from its corresponding cam surface. Movement of a cam follower into and out of engagement with its corresponding cam surface may be in the plane of camming movement or it may be lateral.

Various arrangements are possible for controlled movement of each pawl in response to movement of the cam follower cooperating with the selected cam surface. For example the cam follower and the pawl might be mounted to pivot about a common shaft driven by a pair of endless drive chains. In a preferred embodiment, however, a pawl shaft is carried by a driven main shaft parallel thereto and spaced therefrom, the pawl being pivotally mounted by the pawl shaft for movement into and out of engagement with the pallets, and the cam follower being pivotally mounted by the main shaft and arranged such that pivotal movement of the cam follower during its cooperation with the selected cam surface causes the pawl to pivot about the pawl shaft.

The invention also provides a tile making machine including tile propelling apparatus as defined above, including the various possible modifications discussed.

BRIEF DESCRIPTION OF THE DRAWINGS

A specific embodiment of the invention will now be described, by way of example only, with reference to the accompanying drawings, in which:

FIG. 3 shows a side elevation of the cam surfaces of the apparatus;

FIG. 4 is a cross-sectional view of the line 4—4 of FIG. 3.

DESCRIPTION OF THE PREFERRED EMBODIMENT(S)

Figure 1:
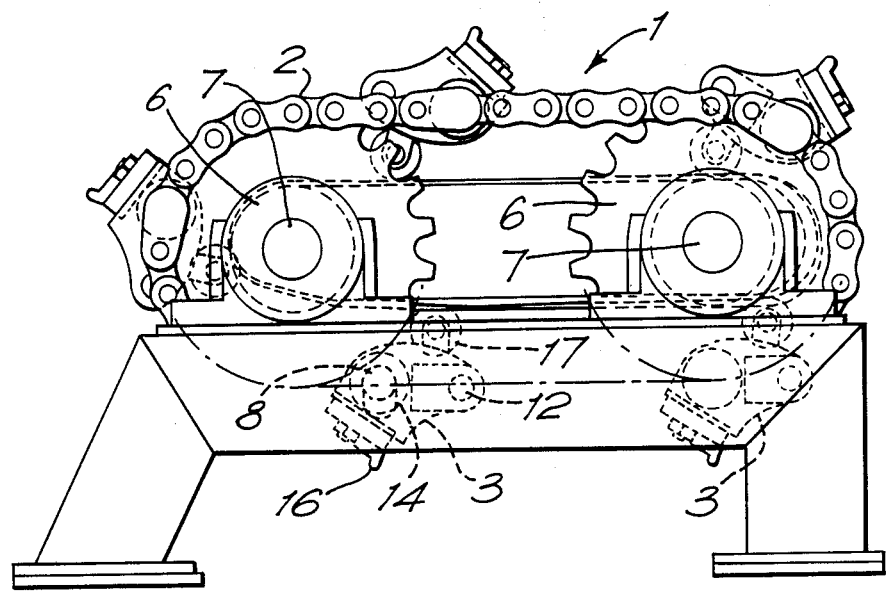
FIG. 1 shows, in diagrammatic form, a side elevation of tile propelling apparatus.
Figure 2:
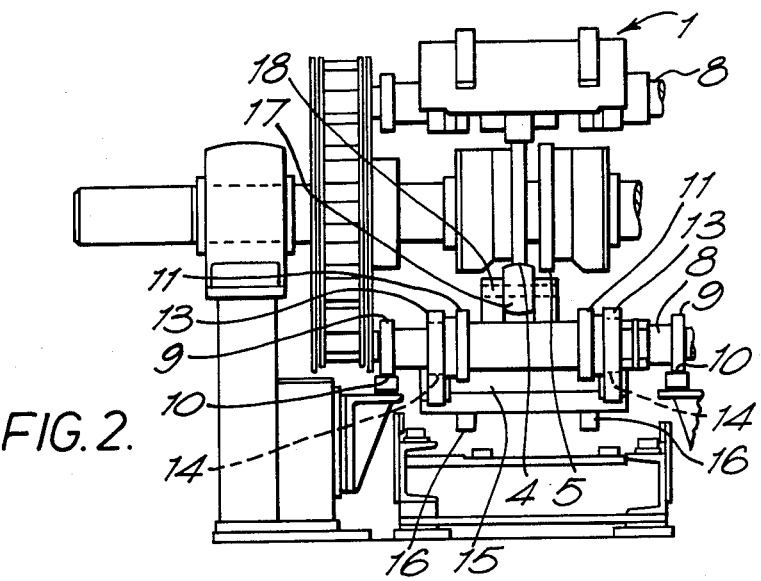
FIG. 2 shows a partial end view of the apparatus.

Referring to FIGS. 1 and 2, the tile propelling apparatus 1 basically comprises a pair of endless drive chains 2 which support a plurality of pawl carries 3 and a pair of cam surfaces in the form of profiled cam tracks 4 and 5. The drive chains 2 are each carried by a pair of toothed wheels 6 supported by shafts 7. Thus although only one wheel 6 and drive chain 2 is shown in the partial end view of FIG. 2, the shaft 7 extends to a corresponding arrangement on the other side of the apparatus.

Each pawl carrier 3 is carried by a main shaft 8 driven at each end by the drive chains 2 and supported by a pair of rollers 9 running on tracks 10. A pair of pawl arms 11 are mounted on the main shaft and a pawl shaft 12 is carried by these arms parallel to the main shaft 8. Outwardly of the pawl arms 11 a pair of outer pawl plates 13 are pivotally mounted on the pawl shaft, the plates being spring biased towards the profiled cam tracks 4 and 5 and away from the pallets being pushed. Each outer pawl plate 13 is provided with an arcuate slot 14 through which the main shaft 8 passes to permit up and down pivotal movement of the pawl plates about the pawl shaft. The pawl plates carry a cross-member 15 which is provided with a pair of pawls 16 for pushing the pallets along the pallet guide means. A cam follower wheel 17 is rotatably mounted in a cradle 18 which is pivotally spring biased about the axis of the main shaft 8 towards the profiled cam tracks 4 and 5. The cradle 18 includes means for engaging the cross-member 15 such that when the cradle is caused to pivot e.g. clockwise (as seen in FIG. 1) about the main shaft axis the engaging means pushes the cross-member causing it, together with the pawl plates 13 and the pawls 16, to pivot anti-clockwise against their spring bias about the pawl shaft 12.

FIGS. 3 and 4 show in greater detail the profiled cam tracks 4 and 5 along which the cam follower wheel 17 runs. The tracks are formed by a pair of cam plates 19 and 20 separated by a spacer 21 and rigidly bolted to a pair of cam side plates 22.

In operation of the propelling apparatus the endless drive chains 2 more in a clockwise direction as viewed in FIG. 1, driving the pawl carriers 3. As seen in FIG. 2, the cam follower wheel 17 of each carrier 3 rolls along the surface of the selected profiled cam track 4 which thereby determines the movement of the pair of pawls 16. At the rear of the apparatus the spacing between the cam track and the path of the drive chain increases as the pawls 16 move down towards the pallets. Each pawl located properly against the appropriate part of the pallet before the enlarged spacing causes the cam follower wheel 17 to pivot anti-clockwise about the main shaft 8, thereby permitting the pawls 16 to pivot clockwise about the pawl shaft 12 under their spring bias. The pawls which have located against the pallet thus accelerate to take over the pushing function from the pawls in front which can then be removed from their pushing position by operation of their own pawl carrier 3.

When it is desired to use a different set of pallets e.g. to produce tiles of a different length the cam follower wheel 17 is switched from one cam track to the other. This is achieved by sliding the entire pawl carrier 3 across on the main shaft 8.

The significance of providing a plurality of cam surfaces in practice is that should a given production line be required to produce, for example, quantities of each of two tiles with lengths of 420 m.m. and 450 m.m. it would normally be necessary to obtain a complete stock of, say, 50,000 pallets of each design and to produce one type for a few weeks, then remove all the pallets from the system, replace or change over the propelling apparatus and re-load the system with 50,000 pallets of the other type. The pallets themselves are expensive, while the continual changing over is expensive in itself and also requires higher inventory levels of finished product to be held. An alternative method would be to operate two separate tile machines, each producing a different length of tile. By taking advantage of the propelling apparatus disclosed herein and producing both tiles on each shift of a single machine, 50,000 fewer pallets are required and the cost of high inventories and change over is reduced.

Modifications to the specific embodiments and to any broad aspects thereof referred to or suggested herein may be apparent to those skilled in the art and the disclosure hereof is intended to encompass any such modifications.

I claim:

1. Apparatus for propelling a succession of pallets in a longitudinal direction, comprising means for pushing the pallets forward on a pallet guide means, the pushing means including a plurality of longitudinally spaced apart pawls each supported by a main shaft driven by a pair of endless drive chains each having a portion extending substantially parallel to said guide means, each said pawl being arranged to move in such a way that in use it engages one of said pallets to push it along the guide means and disengages from the pallet further down the guide means, the movement of each pawl being controlled by an associated cam follower supported by a respective driven main shaft and cooperating with a longitudinally extending profiled cam track, there being two such cam tracks parallel to each other and laterally spaced apart, and means for laterally moving the cam follower associated with each pawl between the cam tracks to select the track having a longitudinal profile appropriate for the type of pallets to be conveyed.

2. Apparatus as claimed in claim 1, wherein a fixing collar is provided for laterally positioning each pawl and its associated cam follower on the shaft.

3. Apparatus as claimed in claim 1, wherein a pawl shaft is carried by each main shaft parallel thereto and spaced therefrom, the associated pawl being pivotally mounted by the pawl shaft for movement into and out of engagement with the pallets, and the associated cam follower being pivotally mounted by the main shaft and arranged such that pivotal movement of the cam follower during its cooperation with the selected cam track causes the pawl to pivot about the pawl shaft.

4. A tile making machine including tile pallet propelling apparatus as claimed in claim 1.

5. Apparatus for propelling a succession of pallets in a longitudinal direction, comprising means for pushing the pallets forward on a pallet guide means, the pushing means including a plurality of pawls spaced apart on an endless drive member having a portion extending substantially parallel to said guide means, each said pawl being arranged to move in such a way that in use it engages one of said pallets to push it along the guide means and disengages from the pallet further down the guide means, the movement of each pawl being controlled by at least one associated cam follower cooperating with a longitudinally extending cam surface, there being a plurality of such cam surfaces laterally spaced from each other and each having a different longitudinal profile, and means for effecting relative movement between the cam followers and said surfaces to select the cam surface having a longitudinal profile appropriate for the type of pallets to by conveyed.

6. Apparatus as claimed in claim 5, wherein two cam tracks are provided comprising the edges of a pair of parallel plates.

7. Apparatus as claimed in claim 5, wherein just one cam follower is associated with each pawl and the cam surface selecting means is arranged to move the cam follower laterally.

8. Apparatus as claimed in claim 7, wherein each pawl and its associated cam follower are together supported by a main shaft driven by a pair of endless drive chains.

9. Apparatus as claimed in claim 8, wherein a fixing collar is provided for laterally positioning each pawl and its associated cam follower on the shaft.

10. Apparatus as claimed in claim 8, wherein a pawl shaft is carried by each main shaft parallel thereto and spaced therefrom, the associated pawl being pivotally mounted by the pawl shaft for movement into and out of engagement with the pallets, and the associated cam follower being pivotally mounted by the main shaft and arranged such that pivotal movement of the cam follower during its cooperation with the selected cam surface causes the pawl to pivot about the pawl shaft.

11. A tile making machine including tile pallet propelling apparatus as claimed in claim 5.

12. Apparatus for propelling a succession of pallets in a longitudinal direction, comprising a plurality of pawls for pushing the pallets forward on a pallet guide means, the pawls being spaced at intervals on an endless drive member having a portion extending substantially parallel to said pallet guide means, each said pawl being arranged to follow a circuit during which the pawl engages one of said pallets to push it along the guide means and disengages from the pallet further down the guide means, the circuit followed by each pawl being controlled by at least one associated cam follower cooperating with longitudinally extending cam means, the cam means comprising first and second cam surfaces having respective longitudinal profiles for causing the pawls to follow first and second circuits, and the apparatus further comprising means for effecting relative movement between the cam followers and said first and second cam surfaces to select the pawl circuit appropriate for the type of pallets to be propelled.

13. Apparatus as claimed in claim 12, wherein just one cam follower is associated with each pawl and the pawl circuit selecting means is arranged to move the cam follower laterally.

14. Apparatus as claimed in claim 13, wherein each pawl and its associated cam follower are together supported by a main shaft driven by a pair of endless drive chains.

15. Apparatus as claimed in claim 14, wherein a fixing collar is provided for laterally positioning each pawl and its associated cam follower on the shaft.

16. Apparatus as claimed in claim 14, wherein a pawl shaft is carried by each main shaft parallel thereto and spaced therefrom, the associated pawl being pivotally mounted by the pawl shaft for movement into and out of engagement with the pallets, and the associated cam follower being pivotally mounted by the main shaft and arranged such that pivotal movement of the cam follower during its cooperation with the selected cam surface causes the pawl to pivot about the pawl shaft.

17. A tile making machine including tile pallet propelling apparatus as claimed in claim 12.

* * * * *